United States Patent [19]

Müller

[11] 3,882,918

[45] May 13, 1975

[54] TIRE CHAIN
[75] Inventor: Anton Müller, Unterkochen, Germany
[73] Assignee: Eisen- und Drahtwerk Erlau Aktiengesellschaft, Germany
[22] Filed: Nov. 2, 1973
[21] Appl. No.: 412,497

[30] Foreign Application Priority Data
Nov. 3, 1972 Germany............................ 2253813

[52] U.S. Cl............. 152/213 R; 152/217; 152/239; 152/241
[51] Int. Cl........................ B60c 27/12; B60c 27/06
[58] Field of Search............ 152/213 R, 213 A, 217, 152/218, 219, 233, 241, 239

[56] References Cited
UNITED STATES PATENTS
| | | | |
|---|---|---|---|
| 1,030,238 | 6/1912 | Himeno | 152/213 A |
| 1,391,261 | 9/1921 | McComb et al. | 152/217 |
| 1,473,797 | 11/1923 | Servis et al. | 152/217 |
| 1,517,749 | 12/1924 | Pigott | 152/217 |
| 1,777,773 | 10/1930 | Sjodin | 152/241 |

Primary Examiner—Drayton E. Hoffman
Attorney, Agent, or Firm—Walter Becker

[57] ABSTRACT

A tire chain in which a running part is linked to spaced points of inner and outer annular side portions, with the side portions being separable in one circumferential region of the tire so it can be opened to lay flat. The outer portion can be drawn taut by a flexible strand interlaced therewith and which has on the end a bar member that extends diametrally of the tire on which the chain is mounted. The inner side portion is separable in a second region and the bar member has a hook on the free end to draw one end of the second region behind a tire for connection to the other end of the second region. After closing the first region of the inner portion, the outer portion can be closed and the flexible strand is then interlaced with the outer portion and draws it taut. The flexible strand is anchored by hooking the free end of the bar member to one of the flexible strand and outer portion at a point diametrally opposite the one circumferential region of the tire.

27 Claims, 2 Drawing Figures

TIRE CHAIN

The present invention relates to tire chains with a running part that is arranged between two marginal parts which in operative condition of the chain are annular. These include namely an outer part which is adapted to be widened relative to the condition of operation and a flexible inner part which has end portions adapted to be detachably connected to each other by means of inner closure means. At one of said end portions behind the tire there is provided an assembly bar with a holding element for pulling through one of the closure elements of the inner closure.

It is an object of the present invention so to design a tire chain of the above mentioned type that in spite of a simple construction an easy and safe mounting of the chain will be assured even when the space conditions behind the tire are relatively narrow as is the case for instance when using twin tires.

These and other objects and advantages of the invention will appear more clearly from the following specification in connection with the accompanying drawing, in which.

Figure 1:
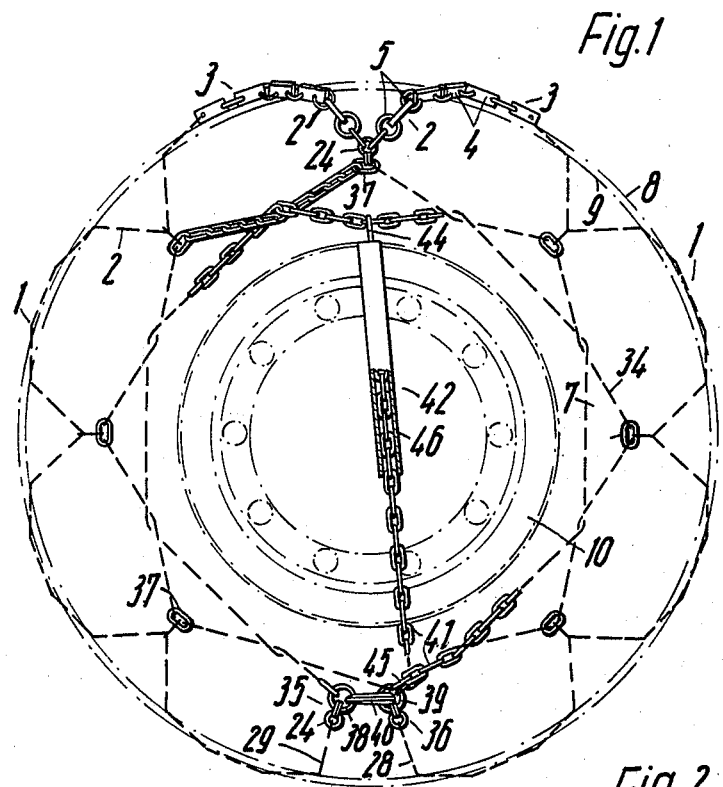
FIG. 1 illustrates a tire chain according to the invention mounted on a tire and showing a view upon the outside of the tire.

The tire chain according to the present invention is characterized primarily in that the assembly bar, which in condition of operation forms a structural element connected to the tire chain at one end exclusively is movably linked to a chain part of the tire chain. The foregoing is furthermore characterized in that a safety member is provided for connecting the assembly bar to the tire chain which safety member in condition of operation of the tire chain engages a section of the assembly bar which is arranged in spaced relationship to the linkage end.

In this way, a safe and in no way interfering storage of the assembly bar on the tire chain has been realized. Thus the assembly bar can for all practical purposes not be lost.

In this connection, it is particularly advantageous to link that end of the assembly bar which faces away from the holding member, movably to a chain portion of the tire chain. In this instance, the holding member is designed as an element preferably in the form of a hook, which is detachable from the pertaining closure member of the inner closure, so that the assembly bar can again be detached from this closure member after the pulling through or pushing through of the pertaining closure member of the inner closure behind the tire. Furthermore, in view of this arrangement, when the tire chain is in its condition of operation, it is possible to store the assembly bar in a relatively easily accessible region of the tire chain.

If the assembly bar is substantially straight, it is possible easily to pass the same behind the tire even if the available space is rather narrow.

In order to assure that the assembly bar particularly is freely movable and consequently can be handled easily, the assembly bar is linked to the tire chain by means of a flexible strand, especially a chain strand.

The present invention provides for further improving the handling of the assembly bar, and in particular the accessibility of the assembly bar. Therefore, the assembly bar is linked to a marginal portion, especially to an end portion of said marginal portion, which is formed by a closure element. This brings about that the assembly bar in condition of operation of the tire chain will not be located within the region of the running part and will for all practical purposes not be subjected to any wear. According to a simple embodiment of the invention, the strand forms a continuation of the pertaining end of the marginal portion while it is preferably linked to the closure member provided at this end portion. In this way, it will be possible that also this closure member can be pulled easily into its assembly position by pulling said strand or the assembly yoke while the tire chain is being assembled.

For purposes of further improving the accessibility of the assembly bar, the latter is linked to a chain part preferably an outer part which is located in spaced relationship to the inner part.

The strand may in a simple manner be designed substantially similar to the pertaining marginal portion which is preferably formed by a chain.

A particularly advantageous further development of the invention consists in that the strand is designed as a tensioning strand which preferably in condition of operation engages the outer part between the linkage points of the running part so that sections pertaining thereto are by means of the tensioning strand tensioned radially inwardly with regard to the tire axis.

For purposes of further simplifying the construction of the tire chain, the assembly bar is formed by a flexible strand section provided with a stiffening element. The same preferably is formed by that end of the strand which is provided with the stiffening element. The stiffening element may be designed in a simple manner as a mantle which surrounds the strand section and which is preferably formed by a hose section or the like placed upon the strand section so that the hand can get a firm grip on the assembly bar.

If the assembly bar is at least slightly bend-elastic, the assembly bar will be able to adapt itself relatively well to conditions respectively during the assembly operations as well as in condition of operation of the tire chain. For instance, the reinforcing element may be designed as a flexible spring bar.

According to a further feature of the invention, the length of the assembly bar is less than the mean diameter of the outer part in condition of operation and is preferably greater than half of said diameter so that the assembly bar can be arranged diagonally on the outside of the tire without causing any interference.

The safety element may be formed by the holding member which is preferably designed as a spring safety hook. Thus only one element is necessary on the assembly bar for connecting the assembly bar in condition of operation of the tire chain as well as for connecting the assembly bar to the closure member of the inner closure.

A further important simplification in the assembly of the tire chain is obtained hereby. Accordingly, the outer part has two ends detachably connected to each other by means of an outer closure. Also the ends of the tire chain are preferably not interconnected between the outer closure and the inner closure over the entire width of the tire chain. In this way, the tire chain can be spread out in front of the tire in completely opened and spread-out condition.

A very safe holding of the tire chain can be realized when the outer closure interconnects two elements of the outer part to which the running part is directly linked. Expediently, the running part is linked to the links of the inner part which are directly adjacent to the links interconnected by the inner closure.

The closure may in a simple manner be formed by a hook and an annular element detachably engaging said hook. Preferably the assembly bar and/or the running part and linked to the annular link.

With the design according to the present invention, it is possible that the outer part and/or the inner part are longitudinally non-displaceably linked to the running part so that a post-tightening of the outer or inner part, for instance by rings, of the running part will not be necessary. Furthermore, it is possible with the design according to the invention that the inner part and the outer part have the same length so that the assembly will still further be simplified.

A particularly advantageous improvement in the tire chain, especially of the described type, is realized according to the invention. This is characterized in that in spaced relationship to the inner closure, a second inner closure is provided on the inner part, the running part is linked to the inner part on both sides between the inner closures. In this way, the inner part during the assembly can be opened in such a way that it is spread out to open relatively widely and thus can easily be slipped over the tire. This is particularly the case when the two inner closures in condition of operation of the chain are located diametrically opposite to each other. Thus, when the inner closures are open, two parts of approximately the same length of the inner part can be slipped over the tire from both sides.

Expediently, on both sides of the second inner closure, chain parts of the running part are linked. With the running part preferably approximately in the center of the width of said running part, these chain parts are connected to each other so that the tire chain can be opened relative to the second inner closure only over a portion of its width and thus can easily be kept in its arranged position.

Advantageously, the second inner closure especially with an evenly numbered pitch of the configurations of the running part is further spaced from that end of the tire chain which comprises the assembly bar than from the other end of the tire chain. Thereby the second inner closure is offset relative to the center of the length of the inner part, preferably by the pitch of the configurations of the running part.

Figure 2:
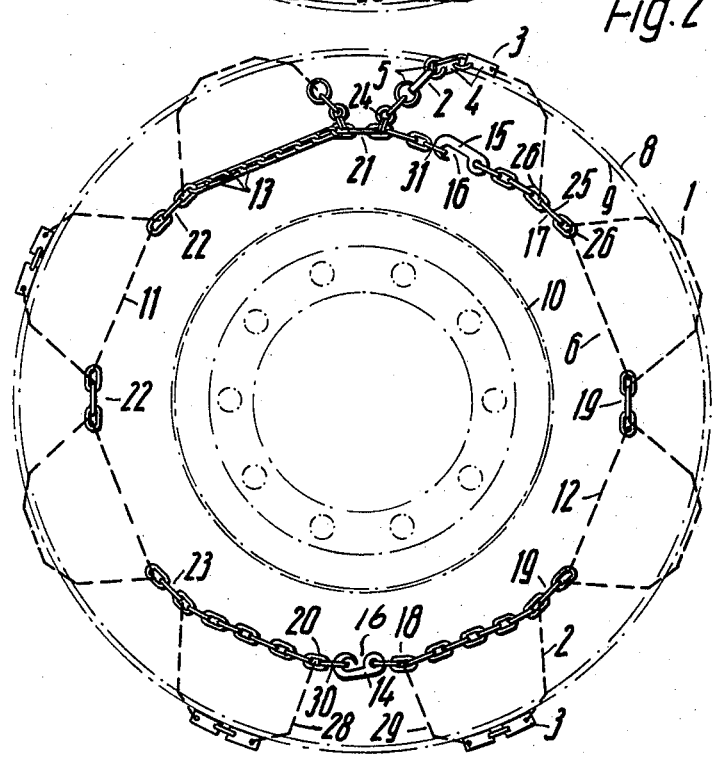
FIG. 2 shows the tire chain of FIG. 1 but viewing the inside of the tire, the tire chain of FIG. 1 being illustrated as having been turned by 180° about a vertical axis intersecting the axis of the tire.

Referring now to the drawing in detail, FIGS. 1 and 2 show a tire chain according to the present invention which comprises a running part 1 composed of chain parts 2 extending at an incline with regard to the circumferential direction of the tire, and chain parts or tract members 3 extend in the circumferential direction of the tire and are located approximately in the center of the width of the tire. The tire chain furthermore comprises web elements 4 and annular links 5 for interconnecting said web links 4. The chain parts 2, which extend at an incline with regard to the circumference and running direction of the tire, form diamond-shaped configurations which are located between the track members 3 and extend over the entire width of the tire. The points of the diamond-shaped configurations which point in the circumferential direction of the tire are respectively connected to each other by means of a track member 3. Each of the track members 3 has two web links 4. The chain parts 2 extending at an incline with regard to the circumferential direction of the tire. There are three web links on the outside of the tire and two web links on the inside of the tire. The running part is provided between two marginal portions 6, 7. The inner part 6, is provided for engagement with the inner side of the tire. The outer part 7 is provided for engagement with the outside of the tire. The tire 8 is in FIGS. 1 and 2 indicated by dot-dash lines and at 9 has tire shoulders or the lateral edges of its running surfaces. The rim 10 on which the tire 8 is mounted is likewise indicated by dot-dash lines.

The annular inner part 6 of the tire chain, which is mounted condition may have a greater means diameter than the outer part 7, is formed primarily by two chain strands 11, 12 of flat oval round steel links 13. Linked to the end links of the slightly shorter chain strand 12 are two open hooks 14, 15 with eyes. Thus, when the chain strand 12 is in stretched-out condition, the hooks 14, 15 face away from each other and their openings 16 for suspending said hooks are located toward the axis of the tire. This chain strand 12 has an arch angle of slightly less than 180°. According to the specific embodiment illustrated by way of example in the drawing, the running part 1 of the tire chain has pitch angle of 45° which means that the arch angle of the repeated configuration of the running part or the distance between the linkage points of the running part on the outer part and inner part amounts to 45°.

It will be seen in FIG. 2 that there are five linkage points 20, 21, 22, 22, 23 of the longer chain 11 with the running part and four linkage points 17, 18, 19, 19 of the shorter chain 12 with the running part. The linkage points 18 and 21 are on opposite sides of closure hook 14 and its link 30 so the tire chain can be opened at that point. The other closure hook 15 and its link 31 are within the circumferential range of a portion of the running part and the tire chain does not open at that point.

The running part 1 is linked by means of closed hook eyes 24 to the chain strands 11, 12 and, more specifically, directly on flat oval links 13. Those chain parts 2 which extend at an incline with regard to the circumferential direction of the tire are respectively connected to two adjacent separate flat oval chain links 26 which are interconnected by a further chain link 25, so that double link areas with two hook eyes 24 are obtained. The chain strands 11, 12 over their entire length are made of substantially identical chain links 13, 25, 26, 30 and 31. The end links 30, 31 of the longer chain strand 11 form directly the engagement links for engagement with the hooks 14, 15.

At one end of the chain strand 11 directly on the chain link engaging the end link 30 there is provided a linkage point 20 of the running part 1. In this region, the running part 1 forms an end part 28 which is not connected by a track member 3 to the oppositely located other end part 29 of the running part 1. The end part 29 is linked to the pertaining end of the chain part strand 12. The linkage point 18 of the running part 1 with the linkage point 20 forms a double linkage area and is located on the other side of the hook 14. The linkage point 18 is provided on the chain link of that chain strand 12 which engages the chain link engaging the hook 15 or, in other words, the second flat oval chain link of the pertaining end of the chain strand 12. Expediently, the hook 14 and the pertaining counter link 30 is provided with markings for instance with the same color marking so that an error during the assembly of the chain will be avoided. The closure of the inner part 6 is formed by the hook 14 and the counter link 30. The closure is thus located between two directly adjacent linkage points 18, 20 of the running part 1. One linkage point is provided on the chain strand 11 and the other linkage point is provided on the chain strand 12 of the inner part. A direct connection of the chain parts of the running part 1 which are located on both sides of said closure is not provided. Thus after opening the inner closure 14, 30 also the running part 1 is opened at least up to the outer part 7 in such a way that both end parts 28, 29 can be moved away from each other.

The counter link 31 of the chain strand 11 is associated with the other hook 15 of the chain strand 12. The link 31 is formed by that other end member of chain strand 11 which is located between two linkage points 17, 21 of chain parts 2. These are interconnected by a track member 3 in such a way that within this region after opening said second inner closure 15, 31 of the inner part 6, the running part 1 will not be open over its entire width but only up to the center of the width of the running part in contrast to the oppositely located region.

The outer part 7 of the tire chain is likewise formed by a chain strand 34 which is composed of substantially identical flat oval links as the inner part 6. The running part 1 is at a pitch which corresponds to the pitch of the inner part 6 linked to the linkage points 35–37 on the outer chain strand 34 with the same hook eyes 24 as on the inner part 6. On the outer part 7 of each linkage point 37, only one hook eye is provided which is engaged by two chain parts 2 which are at an angle with regard to each other and lead to adjacent track pieces or track members 3. Thus, in contrast to the inner part, the outer part has no double linkage points. The stretched-out length of the outer chain strand 34 is greater than the circumference of that circle along which all linkage points 35–37 of the running part 1 are located. Consequently, the chain strand 34 is zigzag-shaped in mounted condition which means that it is approximately V-shaped between each two adjacent linkage points. In view of this design of the chain strand 34, the latter is adapted to be widened relative to the condition of operation as shown in FIG. 1. The chain strand 34 is likewise designed as an open chain strand which has two circular end links 38, 39. One of the two end links, namely the end link 38 provided on the end part 29 of the tire chain has linked thereto a flat hook 40 which may be designed as the hook 14, 15. The hook 40 is adapted detachably to be suspended in the other end member 39 which forms the counter member. Both end links 38, 39 simultaneously serve as links for separate chain parts 2 of the running part 1. These chain parts are formed by the end parts 28, 29, and the end links respectively are equipped with a hook eye 24. Thus, if the outer chain strand 34 of the tire chain is opened by opening the hook 40, it will be appreciated that at the same time the running part 1 opens up to the oppositely located inner closure 14, 30 arranged on the inner side of the tire. The inner closure 14, 30 may likewise be opened so that in such an instance the running part can spread out practically to a stretch position in which both ends 28, 29 thereof are completely separated from each other. On that end member 39 of the chain strand 34 which is detachable engaged by the hook 40, there is linked a further chain strand 41. The chain strand 41 is composed substantially of the same flat oval links as the chain strand 34 and the chain links thereof may likewise be engaged by the hook 40.

For purposes of tightening and maintaining the outer chain strand 34 to be kept in tightened or tensioned condition when the chain is in condition of operation, the chain strand 41 forms a tensioning chain that which has a spring safety hook 44 at its end which faces away from the link 45 linked to the end link 39. The tensioning chain 41 from its linkage point 45 on the chain strand 34 is successively between the linkage points 35–37 of the chain strand 34 braided in or looped into the chain according to FIG. 1 over the entire circumference whereupon the free end comprising the hook 44 is on the outside of the tire passed diagonally over the latter and is by means of the hook 44 detachably connected to the corresponding section of the chain strand 41 or the chain strand 34. The tensioning chain 41 is passed from its linkage point 45 on the larger path to the end member 38 which carries the hook 40.

The free end of the chain strand 41 is designed as assembly bar 42 to which end a hose member 46 of synthetic material or the like is placed upon said end. This hose member 46 is connected to the corresponding end section of the chain strand 41 by friction and stiffens said corresponding end section.

Prior to the mounting of the tire chain according to the invention, all closures 14, 30 and 15, 31 and 40, 39 are in opened condition. The tire chain is laid out on the outside of the tire 8 in the running direction of the latter in such a way that the chain rests on the ground by means of the tire engaging side. The web links 4 of the running part 1 have their receiving openings for the ring links 5 closer to the tire engaging edge than to the running edge so that also the chain is laid out in front of the tire in such a way that the greater zones of wear of the web links 4 are located at the top. The stretched-out inner part 6 of the tire chain is closer to the tire than the outer part 7. Thereupon, the assembly bar 42 linked to the right-hand end 28 of the outer part 7 is passed from the right toward the left behind the tire, and on the left-hand side of the tire, the hook 14 of the inner closure 14, 30 is suspended in the hook 44. By pulling back the assembly bar 42, the hook 14 is pulled toward the right-hand side of the tire behind the latter so that the hook 14 after disengaging the spring safety hook 44 can be connected to the counter link 30. Now the chain is turned about the tire ground contact surface until the inner closure 14, 30 will be located behind the tire approximately in the center of the tire ground contact surface. Thereupon the two chain strands 11, 12 of the inner part 6 are separated from each other within the region of the closure member 15, 31. The strands on the right-hand and left-hand sides are placed upon the tire running surface in such a way that the links 15, 31 of the second inner closure will be located on the top side of the tire. There the strands can be connected to each other whereupon the tire chain is completely slipped over the tire running surface. The track crosses 2, 3 of the running part 1 can then be placed upon the tire running surface in such a way that the track members 3 will be located in the circumferential direction in the center of the tire running surface. The outer closure 39, 40 is then closed while the hook 40 is suspended in the end ring 39 or in the next reachable link of the tensions chain 41. After a few revolutions of the wheel, the chain becomes so loose that the hook 40 can be suspended in the end link 39. Finally, the tension chain 41 is looped in counter clockwise direction through each field of the outer chain 34. Thus the assembly bar 42 will be located diagonally over the rim 10 and can be secured in its position by means of the spring safety hook 44.

It is, of course, to be understood that the present invention is, by no means limited to the specific showing in the drawing but also comprises any modifications within the scope of the appended claims.

What is claimed is:

1. In combination with an anti-skid chain for a tire, said chain having a running part for resting on the tire tread and inner and outer annular marginal portions having spaced points connected to opposite side edges of the running part and disposed at opposite sides of the tire when the chain is mounted thereon including reaching behind the tire during chain assembly therewith, the inner one of said marginal portions including separable connector means, the outer one of said marginal portions being flexible in the radial direction of the tire, and a bar member for holding and pulling use in assembling the chain on a tire and adapted to extend diametrically of the tire, and means for securing the said bar member to the chain in structurally operative condition when disposed diametrically of said tire including a flexible strand movably linked to said outer marginal portion.

2. An anti-skid chain in combination according to claim 1 in which said outer portion is a chain and is linked to said running part at space points, said outer portion having ends and cooperating elements of a closure on said ends, and a flexible strand connecting said bar member as an extension to said chain.

3. An anti-skid chain in combination according to claim 2 in which said flexible strand engages circumferentially spaced points of said outer portion and serves to draw the outer portion tight.

4. An anti-skid chain for a tire, said chain having a running part for resting on the tire tread and inner and outer annular marginal portions having spaced points connected to opposite side edges of the running part and disposed at opposite sides of the tire when the chain is mounted thereon, the inner one of said marginal portions including separable connector means, the outer one of said marginal portions being flexible in the radial direction of the tire, and a bar member for use in assembling the chain on a tire and adapted to extend diametrically of the tire, and means for securing the said bar member to the chain in structurally operative condition when disposed diametrically of said tire, said outer portion being a chain and being linked to said running part at spaced points, said outer portion having ends and cooperating elements of a closure on said ends, and a flexible strand connecting said bar member to said chain, said flexible strand being wrapped around said outer portion at circumferentially spaced points and forming a continuation of said outer portion, said flexible strand engaging circumferentially spaced points of said outer portion and serving to draw the outer portion tight.

5. An anti-skid chain according to claim 4 in which the free end of said bar member comprises a hook, said bar member being adapted for insertion behind a tire for engagement with a said separable connector means of said inner portion for drawing the engaged connector means behind the tire.

6. An anti-skid chain according to claim 1 in which said bar member is substantially straight.

7. An anti-skid chain according to claim 1 in which said bar member is linked to said chain.

8. An anti-skid chain according to claim 5 in which said flexible strand is a chain, said chain being linked to said outer portion near one of said closure elements.

9. An anti-skid chain according to claim 8 in which said running part is linked to said outer part at one of said closure elements, said one closure element comprising a ring, said flexible strand also being connected to said ring.

10. An anti-skid chain according to claim 5 in which said flexible strand is about the same length as said outer portion.

11. An anti-skid chain according to claim 5 in which said bar member is a portion of said flexible strand, and a stiffening member on the said portion of said strand.

12. An anti-skid chain according to claim 11 in which said stiffening member is tubular.

13. An anti-skid chain according to claim 5 in which said bar member is flexible.

14. An anti-skid chain according to claim 5 in which said bar member is shorter than the mean diameter of said outer portion.

15. An anti-skid chain according to claim 5 which includes a safety spring hook on one end of said bar member.

16. An anti-skid chain according to claim 5 in which each of said inner and outer portions are separable in one and the same axial plane to permit the chain to be laid out flat.

17. An anti-skid chain according to claim 16 in which the points of connection of the running part to said inner and outer portions include points of connection on opposite sides of the region of separability of said portions.

18. An anti-skid chain according to claim 5 in which said inner and outer portions are flexibly but nondisplaceably linked to said running part.

19. An anti-skid chain according to claim 5 in which said inner and outer portions are about the same length.

20. An anti-skid chain according to claim 5 in which said inner portion has separable connector means at two circumferentially spaced points thereby dividing the inner portions into two circumferentially spaced parts and each of which includes points of connection to said running part.

21. An anti-skid chain according to claim 20 in which the two parts of said inner portion are about equal in length.

22. An anti-skid chain according to claim 21 in which said running part is linked to said inner portion adjacent each end of each of the said parts of said inner portion.

23. An anti-skid chain according to claim 20 in which one of said two parts is larger than the other thereof.

24. An anti-skid chain according to claim 20 in which each said part of said inner portion is flexible.

25. An anti-skid chain according to claim 20 in which said elements of connector means on said inner portions comprise hooks and links engaged by the hooks, both of said hooks being at the same said part of said inner portion.

26. An anti-skid chain according to claim 25 in which said parts of said inner portions are chains, end links of one of said parts engaging the hooks on the ends of the other part.

27. A tire chain having flexible inner and outer side portions and a running portion extending between said side portions and linked thereto at circumferentially spaced points, separable connectors in said side portions in the same circumferential region of the chain, said running portion being interrupted in said circumferential region so the chain can be opened to lay flat, said inner portion being smaller in diameter than the tire when closed and said outer portion being larger in diameter than said inner portion, a flexible strand having one end connected to a point on the outer portion near one end thereof and engaging said outer portion between the points of connection thereof to said running part, and a bar member connected to the other end of said flexible strand and extending diametrally of the tire and at the free end hooked to one of said strand and outer portion, said strand drawing said outer portion into taut condition between the points of connection of the outer portion to said running part when the outer portion is closed.

* * * * *